June 14, 1927.

W. L. GOODSTEIN

MOTOR VEHICLE LAMP

Filed Oct. 8, 1924

1,632,127

INVENTOR
William L. Goodstein
BY
ATTORNEY

Patented June 14, 1927.

1,632,127

UNITED STATES PATENT OFFICE.

WILLIAM L. GOODSTEIN, OF WAYNESBURG, PENNSYLVANIA.

MOTOR-VEHICLE LAMP.

Application filed October 8, 1924. Serial No. 742,322.

This invention relates to lamps for motor vehicles and is particularly adapted for use on dark roads where the powerful headlights on vehicles passing each other must be dimmed, as it provides a means for illuminating the path of travel of the cars without any strong glare reaching the vision of the approaching driver and at the same time indicates the exact amount of clearance which can be relied upon.

The invention comprises for the attainment of these objects, an auxiliary lamp having improved casing and reflector system with an adjustable lamp and reflector arranged therein, the said lamp being connected with the dimmer switch of the headlight lighting equipment so that when the headlights are dimmed the lamp of my device is illuminated, and a strong light is thrown upon the road in the path of travel but no reflected light is thrown in the eyes of the driver of the approaching car travelling in the opposite direction.

The said adjustability of the lamp and the reflector serve to make it possible to utilize this invention on all sizes and makes of cars as the direction of the projection of the rays of light both reflected and direct can be controlled by the positioning inside of the casing of the said lamp and reflector.

This adjustable feature is also advantageous because when the lamp is mounted on the fender, the reflector and bulb may be adjusted to obtain the exact focus desired and then locked in position permanently.

It is the custom to mount the regular headlights of the motor vehicle on the body thereof on a line well inside of the outer limits of the wheel hubs or mud guards, and it is impossible therefore for the driver of an approaching vehicle to judge from said headlights, whether brightly illuminated or dimmed, precisely what clearance space exists in which to pass the other car. My device being positioned at practically the extreme outer line of the vehicle, the approaching car will clear the said vehicle if it clears the said light.

This invention is simple in its nature, with few parts, is easy to attach and detach, and can be manufactured at a low cost.

The device is more fully described in the following specification and shown in the drawings in which:—

Figure 1:
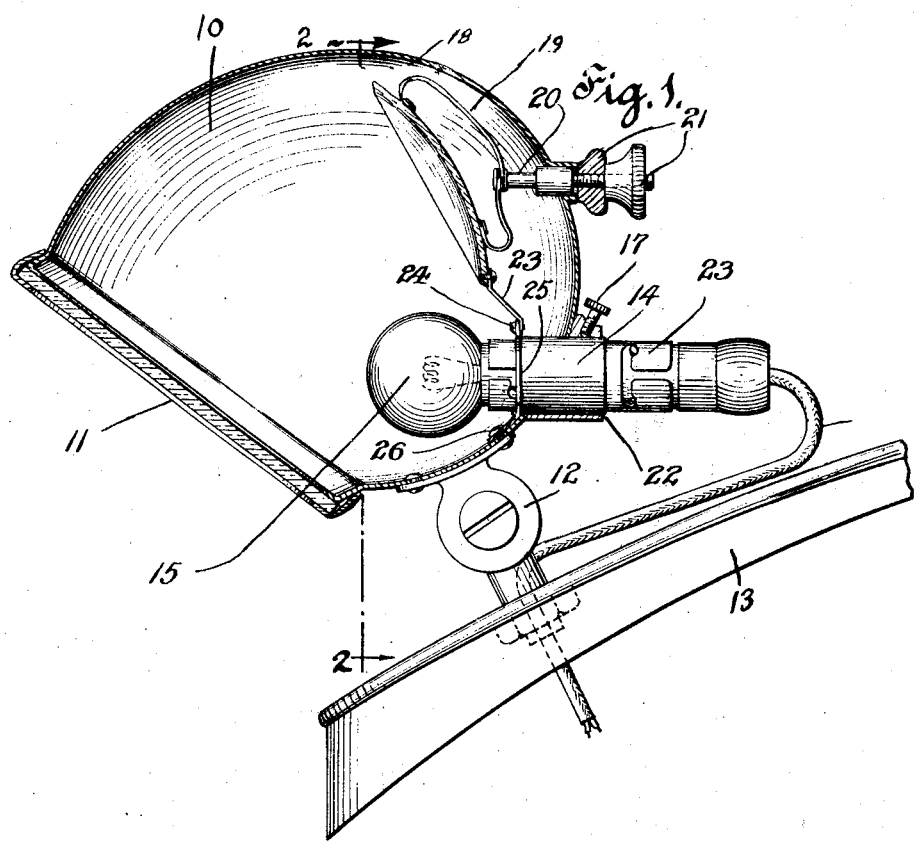
Fig. 1 is a side elevation partly in section, and with part of the casing removed to show the interior.
Figure 2:
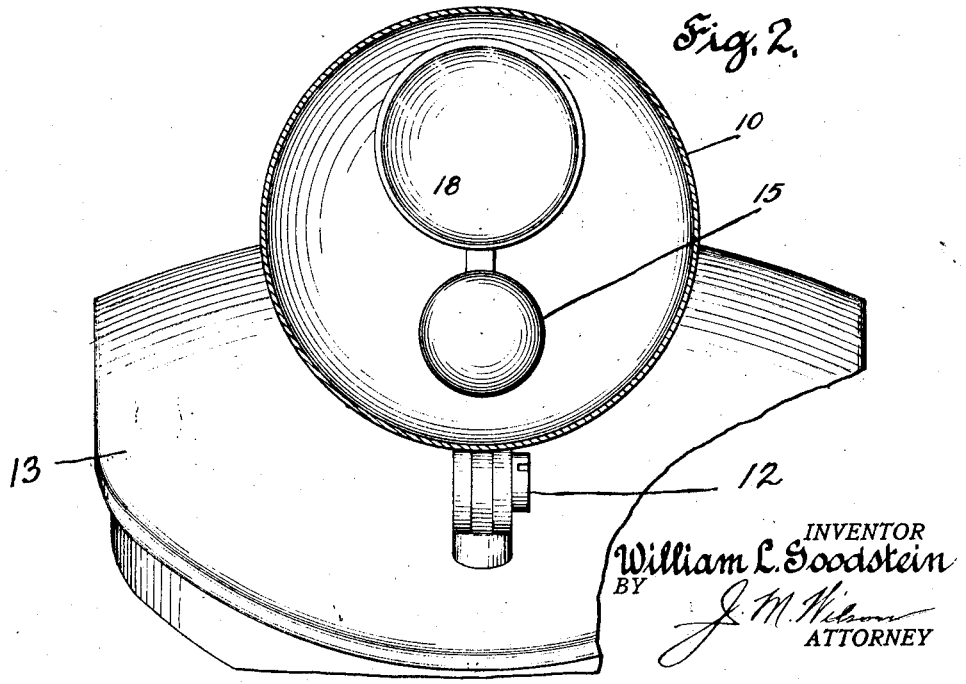
Fig. 2 is a view looking into the front of the lamp to show the relative mounting of the reflector and lamp. As is obvious these interior parts could only be seen by looking upwardly into the lamp as the hood of the casing would shut off a view of the reflector looked at from the level.

The casing 10 shown is substantially bell shaped with the usual glass covered opening 11 in front and pivotally secured at 12 to the front fender 13.

In the lower rear wall of the casing 10 an aperture 22 is provided with the collar 14 for the reception of the socket 23 which carries the bulb 15 and a light connection 16 leading to the dimmer switch of the main lighting system of the vehicle. The thumb screw 17 is provided so that the bulb and its connections may be permanently locked in position after the proper adjustment between the bulb 15 and the reflector 18 has been secured.

The reflector 18 is pivotally mounted at its lower edge, and is movable back and forth to change its position relative to the light by a spring member 19 fastened to the reflector, the spring member engaging with a threaded stem 20 passing through an aperture in the casing and variably positionable with respect thereto by the nuts 21, 21. The pivotal mounting for the reflector comprises a spring arm 23, attached to the lower edge of the reflector, and attached at 24 to the upper part of a collar 25 secured at 26 to the casing 10. By the construction described, the rays from the light may be directed downwardly onto the road at any desired angle.

I claim:—

1. In a motor vehicle lamp, a casing, a collar secured in the casing, a lamp socket passing through said collar, means for variably positioning the lamp socket in the casing, a reflector pivotally mounted on said collar, a spring device mounted on the reflector, and threaded means engageable with the spring device and with the casing, for moving the reflector back and forth and for securing it in desired angular relationship with a lamp bulb in the lamp socket.

2. In a motor vehicle lamp, a casing, a collar mounted in the lower part of the casing, a lamp socket passing through said collar, means for variably positioning the lamp socket in the casing, a reflector pivotally mounted on said collar and located entirely above the level of the lamp bulb, a spring device mounted on the reflector, and threaded means engageable with the spring device and with the casing, for moving the reflector back and forth and for securing it in desired angular relationship with a lamp bulb in the lamp socket.

WILLIAM L. GOODSTEIN.